(12) United States Patent
Hong

(10) Patent No.: US 7,838,162 B2
(45) Date of Patent: Nov. 23, 2010

(54) FUEL CELL SYSTEM AND METHOD OF COMPUTING FUEL LEVEL

(75) Inventor: Ming-Zi Hong, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 220 days.

(21) Appl. No.: 12/214,351

(22) Filed: Jun. 16, 2008

(65) Prior Publication Data
US 2009/0104492 A1    Apr. 23, 2009

(30) Foreign Application Priority Data
Oct. 23, 2007    (KR) .................... 10-2007-0106768

(51) Int. Cl.
*H01M 8/04* (2006.01)
(52) U.S. Cl. .................. 429/447; 429/506; 429/512; 429/515
(58) Field of Classification Search ............ 429/25, 429/34, 13, 462, 506, 512, 515
See application file for complete search history.

(56) References Cited

U.S. PATENT DOCUMENTS

| | | | |
|---|---|---|---|
| 6,815,108 B2 | 11/2004 | Ueda et al. | |
| 2004/0161644 A1* | 8/2004 | Ueda et al. | ............. 429/13 |
| 2004/0173615 A1 | 9/2004 | Goodman | |
| 2005/0069746 A1* | 3/2005 | Kabasawa | ............. 429/34 |
| 2005/0118468 A1 | 6/2005 | Adams et al. | |
| 2006/0006108 A1 | 1/2006 | Arias et al. | |
| 2006/0019135 A1 | 1/2006 | Curello et al. | |
| 2006/0029848 A1 | 2/2006 | Kaye et al. | |
| 2006/0204803 A1 | 9/2006 | Yamaguchi | |

(Continued)

FOREIGN PATENT DOCUMENTS

CN    1784345    6/2006

(Continued)

OTHER PUBLICATIONS

Machine translation of JP 2006278270A, Tomioka, H, Oct. 12, 2006.*

(Continued)

*Primary Examiner*—Jonathan Crepeau
*Assistant Examiner*—Kenneth Douyette
(74) *Attorney, Agent, or Firm*—Knobbe Martens Olson & Bear LLP

(57) ABSTRACT

The present embodiments relate to a fuel cell system having a cartridge stored with liquid fuel and a method of computing a fuel level remained in the cartridge. A fuel cell system of the present embodiments includes: a fuel cartridge for storing fuel; a fuel cell stack for generating power by means of the electrochemical reaction of fuel and oxygen; a fuel pump for sucking fuel stored in the fuel cartridge; a pressure sensor positioned in a fuel channel between a coupling unit of the fuel cartridge and the fuel pump; and a fuel level computing unit for computing a time point when the fuel in the fuel cartridge is almost exhausted. With the present embodiments, the fuel exhaustion in the cartridge can previously sensed at a low cost so that the damage of MEA in the fuel cell can be prevented and the inconvenience or the unexpected damage to a user can be prevented.

9 Claims, 4 Drawing Sheets

U.S. PATENT DOCUMENTS

2007/0077471 A1* 4/2007 Kim et al. .................. 429/25

FOREIGN PATENT DOCUMENTS

| DE | 102006016453 | * | 10/2007 |
| --- | --- | --- | --- |
| JP | 2004-207129 | | 7/2004 |
| JP | 2004288575 A | | 10/2004 |
| JP | 2005-302471 | | 10/2005 |
| JP | 2006-099984 | | 4/2006 |
| JP | 2006278270 A | * | 10/2006 |
| KR | 1020040093022 A | | 11/2004 |
| WO | WO 2004082041 | | 9/2004 |

OTHER PUBLICATIONS

Abstract of DE 102006016453, Weisser, M, Oct. 11, 2007.*
European Search Report for EP 08 25 3350, Samsung SDI Co., Ltd., European Patent Office, Jul. 15, 2009, pp. 7.
Korean Office Action for Application No. 2009-040350838; Applicant: Samsung SDI Co., dated Sep. 29, 2009; 3 pgs.
Korean Office Action for Korean Patent Application No. 10-2007-0106768; Samsung SDI Co., Ltd., 2 pgs, dated Sep. 6, 2010.

* cited by examiner

FUEL CELL SYSTEM AND METHOD OF COMPUTING FUEL LEVEL

CROSS-REFERENCE TO RELATED APPLICATIONS

This application claims priority to and the benefit of Korean Patent Application No. 10-2007-0106768, filed on Oct. 23, 2007 in the Korean Intellectual Property Office, the entire content of which is incorporated herein by reference.

BACKGROUND OF THE INVENTION

1. Field of the Invention

The present embodiments relate to a fuel cell system for refilling fuel through a cartridge exchange, and in particular to a fuel cell system having a cartridge stored with liquid fuel and a method of computing the fuel level remaining in the cartridge.

2. Description of the Related Art

Generally, a fuel cell is a power generation system for directly converting chemical energy into electric energy by means of an electrochemical reaction of hydrogen and oxygen. As the hydrogen, pure hydrogen may be directly supplied to the fuel cell, or hydrogen obtained by reforming materials such as methanol, ethanol, natural gas, etc., may be supplied thereto. As the oxygen, pure oxygen may be directly supplied to the fuel cell system, or oxygen contained in general air using an air pump may be supplied thereto.

The fuel cell may be sorted into a polymer electrolyte membrane fuel cell and a direct methanol fuel cell operating at temperature of 100° C. or less, a phosphoric acid fuel cell operating at about 150 to 200° C., a molten carbonate fuel cell operating at a temperature of 600 to 700° C., and a solid oxide fuel cell operating at a temperature of 1000° C. or more. These respective fuel cells are basically the same in view of a principle of generating electricity, but use different sorts of fuels, catalysts, electrolytes, etc.

Among others, the direct methanol fuel cell (DMFC) directly uses fuel that is a mixture of high concentration methanol of liquid phase and water instead of using hydrogen as fuel. The direct methanol fuel cell is lower in output density than a fuel cell using hydrogen as direct fuel. However, the direct methanol fuel cell has advantages in that it has a high energy density per volume of methanol used as fuel, easily stores the fuel, and is adapted to a situation that the fuel cell is required to operate at a low output and for a long time. Also, the direct methanol fuel cell can be more compactly constituted because an additional device; such as a reformer for reforming fuel to generate hydrogen, etc., is not needed.

Also, the direct methanol fuel cell (DMFC) includes a membrane electrode assembly (MEA) including a polymer electrolyte membrane, and an anode electrode and a cathode electrode contacted to both sides of the polymer electrolyte membrane. As the polymer electrode membrane, fluoro polymer is used. However, since the methanol is excessively rapidly permeated into the fluoro polymer membrane, a crossover phenomenon transmitting non-reactive methanol to the polymer electrolyte membrane occurs when the direct methanol fuel cell uses high concentration methanol as fuel. Accordingly, in order to lower the concentration of methanol, the mixing fuel mixing methanol with water must be supplied to the fuel cell system.

In the case of the fuel cell as described above, in particular a portable DMFC, it is exemplary to use a fuel tank using a cartridge filled with fuel therein rather than to directly inject fluid fuel to the fuel tank in the fuel cell, considering the convenience of a user.

However, when the fuel of the fuel cartridge is exhausted, air is supplied to the MEA of the fuel cell, thereby bring out the fatal damage to the fuel cell system. Therefore, an apparatus for informing a user of the fuel exhaustion in the fuel tank or stopping the fuel cell system by sensing it beforehand is needed. However, since the cartridge type fuel cell system is a compact system, adding the apparatus for sensing the fuel exhaustion beforehand to the cartridge imposes a heavy burden on the fuel cell system in view of volume and cost.

Also, in the fuel cell system with a structure for preventing the injection of air to the MEA of the fuel cell, abruptly stopping electronic equipment due to the fuel exhaustion in the fuel cell system during the use of electronic equipment causes a user great inconvenience and a risk of data loss.

SUMMARY OF THE INVENTION

The present embodiments solve the above problems and provides additional advantages as well. It is an object of the present embodiments to provide a fuel cell system capable of sensing the fuel exhaustion in a cartridge beforehand with a low cost.

In order to accomplish the objects, a fuel cell system of the present embodiments includes: a fuel cartridge for storing fuel; a fuel cell stack for generating power by means of the electrochemical reaction of fuel and oxygen; a fuel pump for sucking fuel stored in the fuel cartridge; a pressure sensor positioned in a fuel channel between a coupling unit of the fuel cartridge and the fuel pump; and a fuel level computing unit for computing a time point when the fuel exhaustion in the fuel cartridge is near.

In order to accomplish the objects, a method of computing a fuel level performed in a fuel cell system of the present embodiments includes: monitoring pressure in a fuel channel prior to a fuel pump; and if a difference in the pressure exceeds a first predetermined reference value during predetermined time, computing that the fuel exhaustion is near.

BRIEF DESCRIPTION OF THE DRAWINGS

These and/or other embodiments and features will become apparent and more readily appreciated from the following description of certain exemplary embodiments, taken in conjunction with the accompanying drawings of which.

DETAILED DESCRIPTION OF EXEMPLARY EMBODIMENTS

Figure 1:
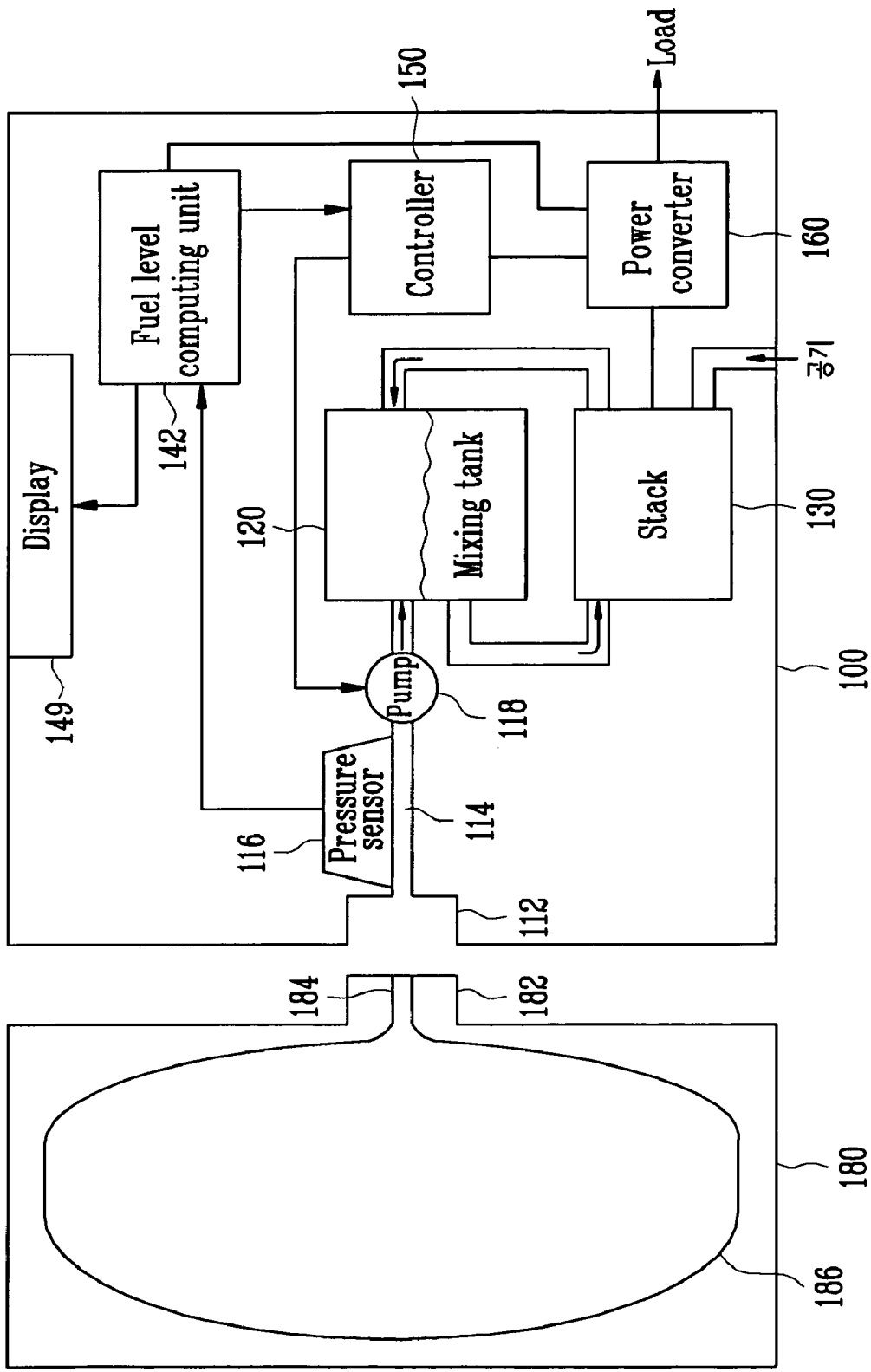
FIG. 1 is a schematic view showing a fuel cell system according to one embodiment.

Hereinafter, certain exemplary embodiments will be described with reference to the accompanying drawings. Here, when a first element is described as being coupled to a second element, the first element may be not only directly coupled to the second element but may also be indirectly coupled to the second element via a third element. Further, elements that are not essential to the complete understanding of the present are omitted for clarity. Also, like reference numerals refer to like elements throughout.

Hereinafter, exemplary embodiments will be described in a more detailed manner with reference to the accompanying drawings in order for those skilled in the art to easily carry out the embodiments. However, the present embodiments can be implemented in several forms, and are not limited thereto.

For example, a term called as a fuel cell stack is used throughout the description of the present embodiments. However, this is for convenience only. The fuel cell stack used in the description of the present embodiments includes a stack comprising stacked type unit cells, a stack comprising flat type unit cells, and a unit stack including single unit cells.

Also, the present embodiments are described based on the direct methanol fuel cell including a mixing tank for recycling non-reactive fuel. However, the idea of the present embodiments can be applied to any of fuel cell systems using liquid fuel (for example, ethanol, acetic acid, hydrogen containing alloy solution, etc). This also belongs to the scope of the present embodiments.

FIG. 1 shows a basic structure of a DMFC fuel cell system which is a cartridge exchange mode according to the present embodiments.

FIG. 1 shows a fuel cell system including a mixing tank 120 for diluting fuel in a fuel cartridge 180 by mixing it with cathode by-products of a fuel cell stack 130. However, the idea of the present embodiments can be applied to a fuel cell system without a mixing tank.

In FIG. 1, the mixing tank 120 receives effluents of the fuel cell stack 130 from one pipe, but actually receives both cathode effluents and anode effluents of a MEA including the fuel cell stack 130.

Also, a condenser for condensing a gas component of the effluents of the fuel cell stack 130 into a liquid component can be provided in the pipe of the mixing tank 120 and the fuel cell stack 130.

High concentration methanol is stored in the fuel cartridge 180 serving as the fuel tank. If the fuel cartridge 180 and the fuel cell system 100 are combined, the fuel cell system 100 can receive the fuel from the fuel outlet of the fuel cartridge 180 by using a fuel pump 118. The fuel cartridge 180 includes a pouch 186 storing the liquid fuel, and the liquid fuel stored in the pouch 186 is moved to the fuel pump 118 of the combined fuel cell system 100 via an exhaust pipe 184.

The pouch 186 can be implemented by a plastic material such as PVC, etc., and has the property that when it is crushed and its volume is reduced, this occurs without a change in its surface area when the fuel stored therein is consumed.

The mixing tank 120 mixes the high concentration fuel received from the fuel cartridge 180 with the cathode products of the fuel cell stack 130 to produce a methanol aqueous solution with proper concentration and to supply it to the anode of the fuel cell stack 130.

The power converter 160 converts voltage/current of power generated by the electrochemical reaction in the fuel cell stack to be compliant with usage and transfers it to an external load and supplies some power as a driving power for components in the fuel cell, in particular a driving controller 150 and/or a fuel level computing unit 140.

In the state where the fuel cartridge 180 is coupled to the fuel cell system 100, the fuel pump 118 performs a pumping according to an instruction of the driving controller 150. Accordingly, force intending to maintain the internal volume of the pouch 186 is applied by the self-elasticity of the pouch 186 and the fuel channel 114 of the fuel cell system 100 is applied with some negative pressure by means of this force. Here, a pressure sensor 116 senses a fuel pressure in the fuel channel 114.

Figure 2:
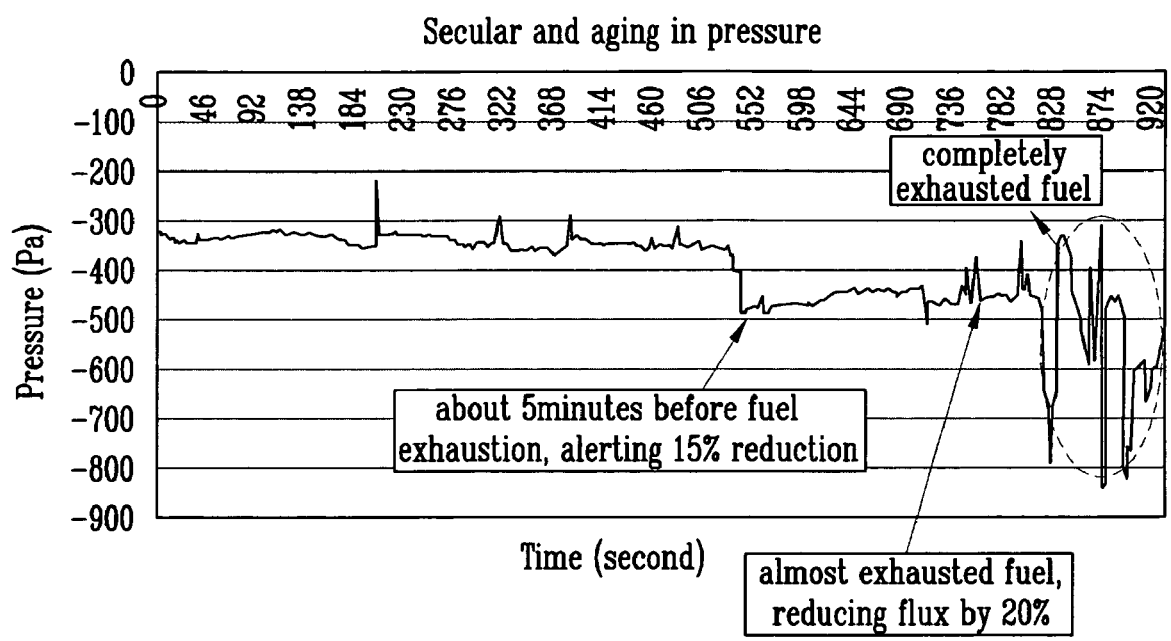
FIG. 2 is a graph showing a pressure change in a fuel channel prior to a fuel pump when using a pouch type cartridge.

FIG. 2 is a graph showing a change in a sensing value detected in a pressure sensor when the fuel cartridge comprising the pouch of PVC material is applied to the fuel cell system according to the present embodiments.

As shown, it can be appreciated that there is a point where the sensing value indicating the constant negative pressure rapidly drops 5 minutes before the fuel exhaustion. It is estimated that this phenomenon occurs at a time point where force resistant to the reduction in the volume of the pouch due to the fuel consumption and the reduction in the volume of the pouch due to the pouch material itself occurs.

The fuel level computing unit 140 monitors the sensing value of the pressure sensor 116 to recognize a point where the pressure rapidly drops 5 minutes before the fuel exhaustion. Thereafter, the fuel level computing unit judges the time point as a time point where the fuel exhaustion is near. According to the implementation, if the fuel level computing unit 142 judges as a point where the fuel exhaustion is near, it can inform a user of the fuel exhaustion using, for example, sound, voice or light such as an LED, etc., and/or perform the driving stop of the fuel cell system. In some embodiments, the fuel cell system of FIG. 1 includes a display device 149 such as an LED, etc. In the case where the driving of the fuel cell system stops, first the fuel pump 118 first stops and other components stop when the power generation capacity of the fuel cell stack 130 is dropped due to the stop of the supply of fuel. The fuel pump 118 may use a linear motor type pump, however, in some embodiments a compact system uses a diaphragm pump with a pumping pressure in a pulse form, etc. In the case of the diaphragm pump, when there is sufficient fuel in the fuel cell system, the pumping pressure according to the pumping of the diaphragm pump with respect to the pumping signal in the pulse form has no great effect on the sensing value of the pressure sensor.

Hereinafter, a method of computing fuel residuals performed in the fuel level computing unit will be described with reference to FIGS. 3A and 3B.

The method of computing fuel residuals performed in the fuel level computing unit includes (a) monitoring pressure in the fuel channel prior to the fuel pump (S110); and (b) if the difference in pressure for a predetermined time window exceeds a predetermined reference value (S120), judging that the fuel is almost exhausted (S130). When it is judged that the fuel is almost exhausted, the method further includes displaying an alert message (S140).

In the step (a), the starting point and the ending point are varied with the passage of time when monitoring the pressure, and since the interval therebetween requires the pressure sensing values in a constant time interval (referred to as a time window), the pressure sensing values are stored in a predetermined time window during which a boundary moves with the passage of time by using a circulation buffer. The fuel level computing unit periodically obtains the pressure sensing values. In the case of using the circulation buffer, the recent pressure sensing values are overwritten on a position where the pressure sensing values at the first time point are stored. With this, the sensing values obtained at the time point corresponding to the time window with a constant size at any time are stored.

In the step (b) searches the maximum value and the minimum value of the pressure sensing values stored in the circulation buffer are searched to judge the difference therebetween as the difference in pressure.

In step (c), a user can be informed that the fuel cartridge can be soon exhausted by using a display means such as an LED or an LCD or an acoustic means such as a speaker installed in the fuel cell system.

As shown in a graph of FIG. 2, when observing a waveform of a pressure measuring value during the fuel exhaustion and a waveform of a pressure measuring value when the fuel is almost exhausted, the pressure sensing value is rapidly reduced by a first predetermined gap at any time point (5 minutes age in the graph) during the fuel exhaustion and when the fuel is almost exhausted, the waveform in the pressure sensing value greatly fluctuates so that the difference between the maximum value and the minimum value is much greater than the first gap.

Therefore, as the method of computing the time point where the fuel is almost exhausted in order to make two-step measures such as the alert and the system stop corresponding to the fuel exhaustion, there are a first method judging that the fuel is almost exhausted when the difference between the maximum value and the minimum value of the pressure sensing value in the time window is larger than a second predetermined reference value that is larger than the first gap, a second method judging that the fuel is almost exhausted when the predetermined time (5 minutes in the graph) is elapsed from a time point where the fuel exhaustion is near as judged in the step (b), and a third method judging that the fuel is almost exhausted from a generation frequency of a ripple in the waveform of the monitored pressure sensing value. Among others, it is not exemplary that the implementation of the third method is considerably complicated.

Figure 3A:
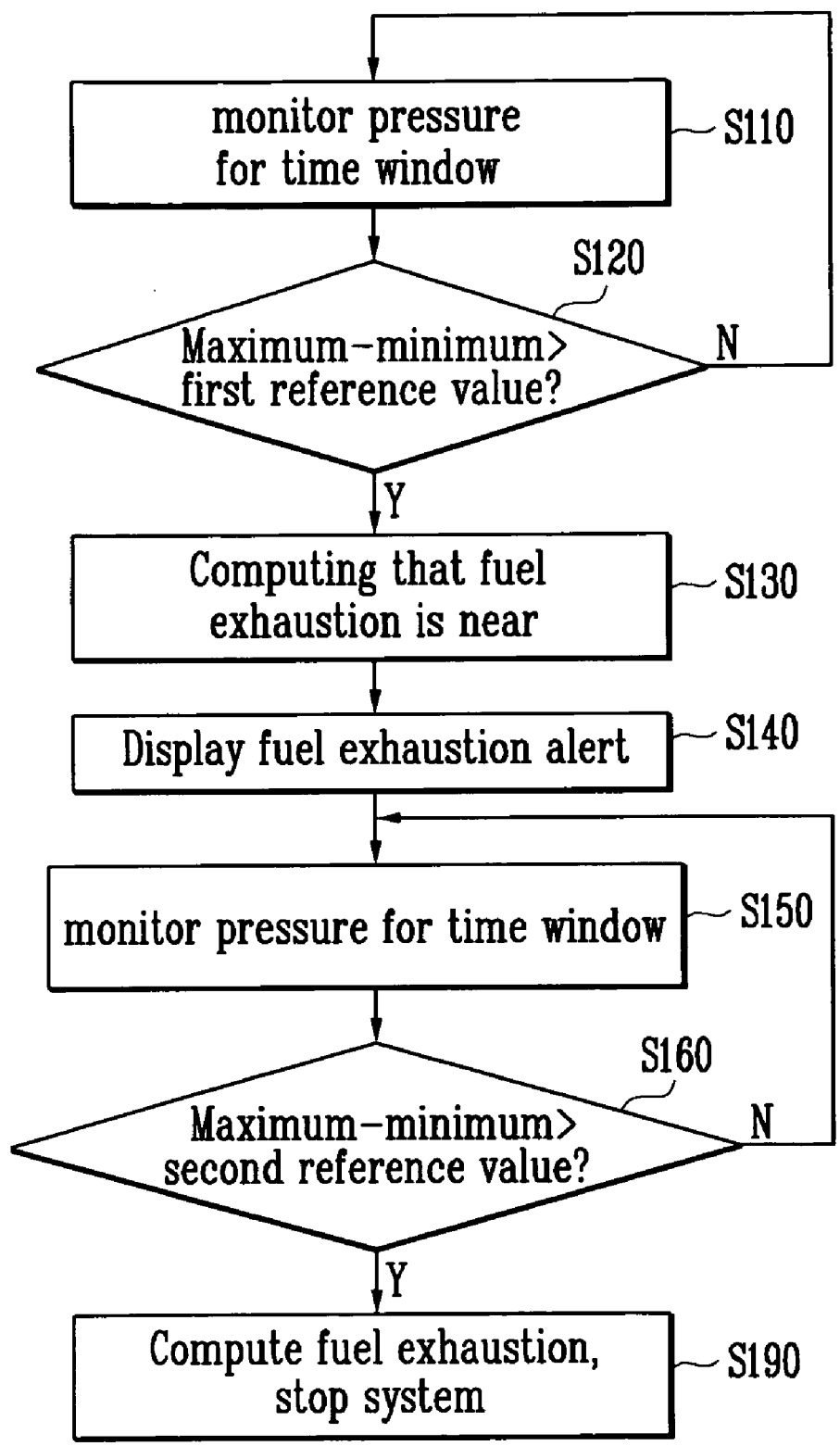
FIG. 3A is a flow chart showing one embodiment of a method of computing a fuel level performed in the fuel level computing unit of FIG. 1.

In the case of the first method shown in FIG. 3A, the method of computing a fuel level in the present embodiment may further include: (d) if it is judged that the fuel exhaustion is near in the step (b), continuously monitoring (S150) the pressure in the fuel channel prior to the fuel pump along with the performance of the step (c); (e) stopping (S190) the fuel cell system by judging the fuel exhaustion when the difference in pressure exceeds the second predetermined reference value (S160) for a predetermined time.

Figure 3B:
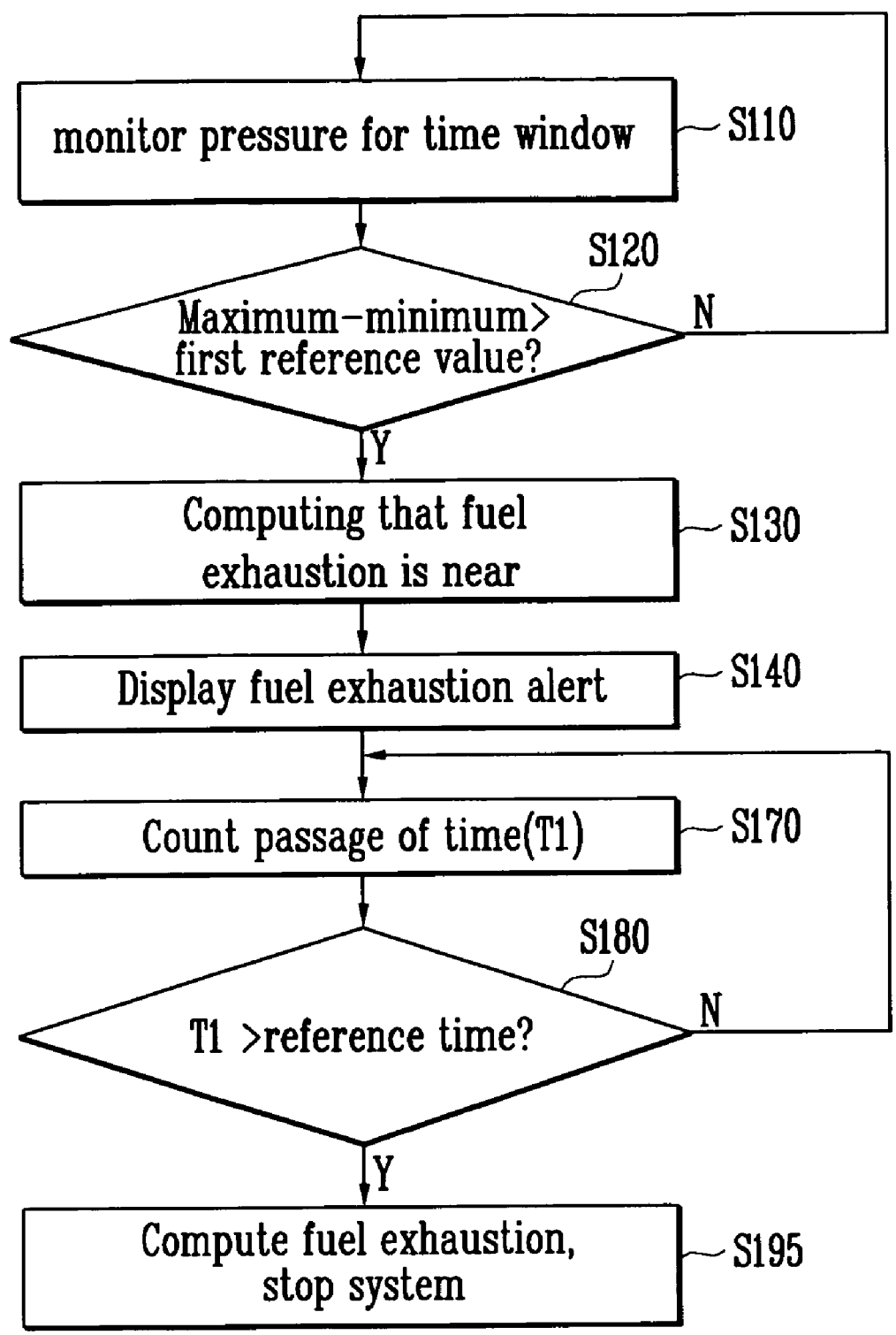
FIG. 3B is a flow chart showing another embodiment of a method of computing a fuel level performed in the fuel level computing unit of FIG. 1.

In the case of the second method shown in FIG. 3B, steps (d) and (e) are omitted, and the steps (d) and (e) can be replaced by step (f) of counting (S170) the passage of time from a time point where the fuel exhaustion judged in the step (b) is near; and (g) if the counted value exceeds the predetermined reference time (S180), stopping (S195) the fuel cell system by judging as the fuel exhaustion.

The driving of the fuel cell system stops in the steps (e) and (g). At this time, it is exemplary to first stop the fuel pump rather than abruptly and simultaneously stop the entire fuel cell system in order to prevent the injection of air to the fuel cell stack and then to stop other components if the fuel filled in the fuel cell stack is exhausted so that the output voltage is lowered and the present embodiments are not limited hereto.

With the performance of the fuel cell system of the present embodiments performing the method of computing the fuel level according to the constitution, the fuel exhaustion in the cartridge can be sensed at a low cost so that the damage of MEA in the fuel cell can be prevented and the inconvenience or the unexpected damage to a user's data can be prevented.

Although exemplary embodiments have been shown and described, it would be appreciated by those skilled in the art that changes might be made in this embodiment without departing from the principles and spirit of the embodiments, the scope of which is defined in the claims and their equivalents.

What is claimed is:

1. A fuel cell system comprising:
   a fuel cartridge storing fuel;
   a fuel cell stack configured to generate power by means of the electrochemical reaction of fuel and oxygen;
   a fuel pump configured to suck fuel stored in the fuel cartridge;
   a pressure sensor positioned in a fuel channel between a coupling unit of the fuel cartridge and the fuel pump; and
   a fuel level computing unit configured to compute a time point of fuel exhaustion in the fuel cartridge
   wherein the fuel level computing unit comprises a circulation buffer storing the sensing values of the pressure sensor in a predetermined time window,
   wherein if the difference between a maximum value and a minimum value of the sensing values in the circulation buffer exceeds a first predetermined reference value, the fuel level computing unit computes this as a time point where the fuel exhaustion is near.

2. The fuel cell system as claimed in claim 1, wherein the fuel level computing unit computes the time point of fuel exhaustion and then monitors the pressure of the pressure sensor, and,
   wherein if the difference between a maximum value and a minimum value of the sensing values in the circulation buffer exceeds a second predetermined reference value, the fuel level computing unit stops the fuel cell system.

3. The fuel cell system as claimed in claim 1, wherein if the passage of time from the time point of fuel exhaustion exceeds a predetermined reference time value, the fuel level computing unit stops the fuel cell system.

4. The fuel cell system as claimed in claim 1, wherein the fuel cartridge comprises a pouch container with a substantially constant surface area but a variable volume according to the fuel consumption.

5. The fuel cell system as claimed in claim 4, wherein the pouch container comprises a plastic material.

6. The fuel cell system as claimed in claim 1, further comprising a mixing tank generating a diluted fuel that is a mixture of fuel sucked in the fuel pump and effluents of the fuel cell stack;
   wherein the mixing tank is configured to supply the diluted fuel to the fuel cell stack.

7. The fuel cell system as claimed in claim 1, further comprising a power converter configured to convert power generated in the fuel cell stack to be suitable for transfer to an external load.

8. The fuel cell system as claimed in claim 1, further comprising a driving controller configured to control the operation of each component in the fuel cell system.

9. The fuel cell system as claimed in claim 8, wherein the driving controller and the fuel level computing unit are the same arithmetic unit.

* * * * *